(12) United States Patent
Abbing et al.

(10) Patent No.: US 9,089,160 B2
(45) Date of Patent: Jul. 28, 2015

(54) DEVICE FOR THERMALLY TREATING A POURABLE PLANT PRODUCT

(75) Inventors: Wim Abbing, Bedburg-Hau, DE (US); Thomas Koziorowski, Muelheim an der Ruhr, DE (US); Karl-Heinz Proest, Emmerich am Rhein, DE (US); Heinrich Baumeister, Emmerich am Rhein, DE (US)

(73) Assignee: PROBAT-WERKE VON GIMBORN MASCHINENFABRIK GMBH, Emmerich (DE)

( * ) Notice: Subject to any disclaimer, the term of this patent is extended or adjusted under 35 U.S.C. 154(b) by 144 days.

(21) Appl. No.: 14/116,345

(22) PCT Filed: Jan. 25, 2012

(86) PCT No.: PCT/EP2012/051136
§ 371 (c)(1),
(2), (4) Date: Nov. 8, 2013

(87) PCT Pub. No.: WO2012/152452
PCT Pub. Date: Nov. 15, 2012

(65) Prior Publication Data
US 2014/0068964 A1    Mar. 13, 2014

(30) Foreign Application Priority Data
May 9, 2011   (DE) .......................... 10 2011 101 059

(51) Int. Cl.
*F26B 21/06*   (2006.01)
*A23N 12/12*   (2006.01)
(Continued)

(52) U.S. Cl.
CPC .............. *A23N 12/125* (2013.01); *A23F 5/046* (2013.01); *A23N 12/08* (2013.01)

(58) Field of Classification Search
CPC .......... F26B 19/00; F26B 21/00; F26B 21/06; A23N 5/00; A23N 5/04; A23N 12/125; A23F 5/00; A23F 5/046; B07B 1/00; B07B 1/28
USPC ............. 34/579, 582, 586, 589; 209/270, 522
See application file for complete search history.

(56) References Cited

U.S. PATENT DOCUMENTS 3,691,644 A * 9/1972 Schnitzer ........................ 34/365
4,615,123 A   10/1986 Brown
(Continued)

FOREIGN PATENT DOCUMENTS

CN        1093798 A    10/1994
DE     101 56 887 C1   4/2003
(Continued)

*Primary Examiner* — Stephen M Gravini
(74) *Attorney, Agent, or Firm* — Norman B. Thot

(57) ABSTRACT

A device for thermally treating a pourable plant product includes a receiving device configured to receive the pourable plant product and a gas supply channel configured to supply a heated gas to the receiving device. The gas supply channel is divided directly upstream of the receiving device, in a gas flow direction, into a first gas supply sub-channel and a second gas supply sub-channel which follow each other in a direction of gravity, and which are configured to supply the heated gas to the receiving device. A cross section of at least the first gas supply sub-channel is configured to be closed or reduced before the receiving device independently of the second gas supply sub-section so as to eliminate or reduce a volume of the heated gas to the receiving device via the first gas supply sub-channel.

14 Claims, 3 Drawing Sheets

(51) Int. Cl.
*A23N 12/08* (2006.01)
*A23F 5/04* (2006.01)

(56) References Cited

U.S. PATENT DOCUMENTS

| | | | |
|---|---|---|---|
| 4,875,904 A | 10/1989 | Munk | |
| 4,958,443 A | 9/1990 | Haueter et al. | |
| 5,651,193 A * | 7/1997 | Rhodes et al. | 34/531 |
| 5,860,221 A * | 1/1999 | Morrison et al. | 34/64 |
| 5,894,936 A * | 4/1999 | Sanders et al. | 209/270 |
| 6,101,739 A * | 8/2000 | Rutz et al. | 34/373 |
| 6,185,842 B1 * | 2/2001 | Brashears | 34/369 |
| 7,140,122 B1 * | 11/2006 | Adams et al. | 34/361 |
| 7,143,686 B1 | 12/2006 | Sandolo | |
| 7,350,318 B2 * | 4/2008 | Dachauer et al. | 34/576 |
| 7,404,262 B2 * | 7/2008 | Jurkovich et al. | 34/381 |
| 7,730,633 B2 * | 6/2010 | Jurkovich et al. | 34/381 |
| 8,590,173 B1 * | 11/2013 | Mengle | 34/259 |
| 8,601,714 B2 * | 12/2013 | Morrison et al. | 34/167 |
| 8,640,360 B2 * | 2/2014 | Stamm et al. | 34/418 |
| 8,978,576 B2 * | 3/2015 | Brandt et al. | 118/19 |
| 2004/0000239 A1 | 1/2004 | Munk | |
| 2004/0094090 A1 * | 5/2004 | Stadel et al. | 118/715 |
| 2005/0132893 A1 | 6/2005 | Arora et al. | |
| 2006/0234095 A1 * | 10/2006 | Kong et al. | 429/26 |
| 2010/0083525 A1 * | 4/2010 | Lange et al. | 34/443 |
| 2013/0305972 A1 * | 11/2013 | Chen et al. | 110/342 |
| 2014/0068964 A1 * | 3/2014 | Abbing et al. | 34/579 |

FOREIGN PATENT DOCUMENTS

| | | | |
|---|---|---|---|
| DE | 10 2007 006 268 B3 | 5/2008 | |
| DE | 102009007902 A1 * | 8/2010 | C12M 1/113 |
| DE | 102010024613 A1 * | 12/2011 | |
| EP | 0 288 870 A2 | 11/1988 | |
| EP | 1 374 704 A1 | 1/2004 | |
| EP | 1676819 A1 * | 7/2006 | |
| GB | 2 167 315 A | 5/1986 | |
| JP | 2010-517547 A | 5/2010 | |
| WO | WO 03033131 A1 * | 4/2003 | |
| WO | WO 2005/058073 A1 | 6/2005 | |

* cited by examiner

1

DEVICE FOR THERMALLY TREATING A POURABLE PLANT PRODUCT

CROSS REFERENCE TO PRIOR APPLICATIONS

This application is a U.S. National Phase application under 35 U.S.C. §371 of International Application No. PCT/EP2012/051136, filed on Jan. 25, 2012 and which claims benefit to German Patent Application No. 10 2011 10 1059.2, filed on May 9, 2011. The International Application was published in German on Nov. 15, 2012 as WO 2012/152452 A1 under PCT Article 21(2).

FIELD

The present invention relates to a device for thermally treating a pourable plant product, for example, for roasting coffee beans.

BACKGROUND

In the production of roasted coffee, it is desired to obtain the desired product after roasting times of minimum length. Currently, due to the formation of acrylamide in the case of short roasting periods, there is also a demand for the availability of roasting devices which are suited for long-time roasting. For each respective process type, i.e., short-time roasting or long-time roasting, a corresponding special roasting system is required. Short roasting times are presently realized, for example, by use of tangential roasters.

A device for roasting coffee beans is described in DE 10 2007 006 268 B3.

Roasting devices of the types used to date have the disadvantage of being suited exclusively for short-time roasting or for long-time roasting.

SUMMARY

An aspect of the present invention is to provide a device for thermally treating a pourable plant product, for example, for roasting coffee beans, which is suited for both short-time roasting and long-time roasting.

In an embodiment, the present invention provides a device for thermally treating a pourable plant product which includes a receiving device configured to receive the pourable plant product and a gas supply channel configured to supply a heated gas to the receiving device. The gas supply channel is divided directly upstream of the receiving device, in a gas flow direction, into a first gas supply sub-channel and a second gas supply sub-channel which follow each other in a direction of gravity, and which are configured to supply the heated gas to the receiving device. A cross section of at least the first gas supply sub-channel is configured to be closed or reduced before the receiving device independently of the second gas supply sub-section so as to eliminate or reduce a volume of the heated gas to the receiving device via the first gas supply sub-channel.

BRIEF DESCRIPTION OF THE DRAWINGS

The present invention is described in greater detail below on the basis of embodiments and of the drawings in which.

DETAILED DESCRIPTION

Figure 1:
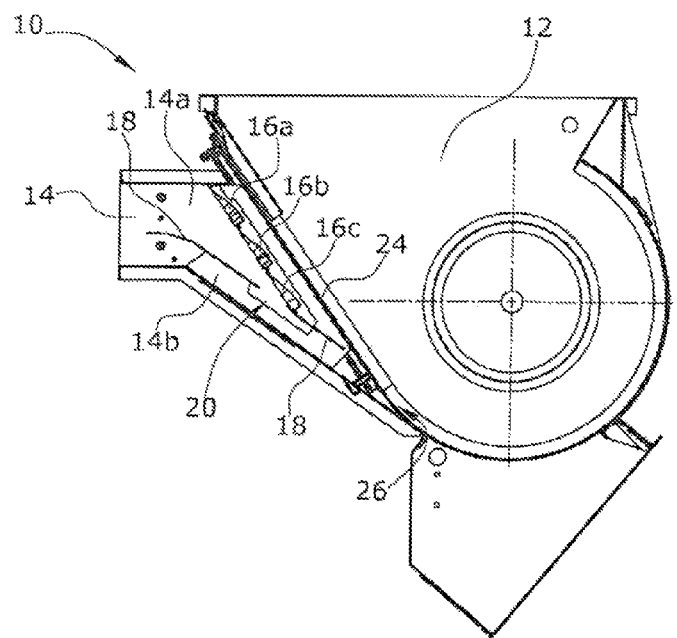
FIG. 1 shows a partially sectional lateral view of an embodiment of the device of the present invention.

In an embodiment of the present invention, the device is suited for thermally treating a pourable plant product, for example, for roasting coffee beans. The device of the present invention is advantageously also useful for roasting other roastable products such as, for example, cocoa beans, cereals, nuts or oilseeds.

In an embodiment of the present invention, the device comprises a receiving device for receiving the plant product. The receiving device can be a roasting bin, for example, a roasting drum. A stationary roasting bin can be used, for example, with a mixing mechanism arranged internally thereof for mixing the product.

In an embodiment of the present invention, the device further comprises a gas supply channel for supplying a heated gas from a heating device to the receiving device. Supply of the heated gas to the receiving device can be performed, for example, via a perforated metal plate which, as viewed in the flow direction of the gas, is arranged directly upstream of the receiving device. In an embodiment of the present invention, only a part of the heated gas can, for example, be supplied to the receiving device via a perforated metal plate.

In an embodiment of the present invention, the gas supply channel is divided, at least in the direction of the gas flow and directly upstream of the receiving device, into two supply sub-channels through which heated gas can be supplied to the receiving device. The gas supply channel can, for example, be divided into two sub-channels along 50% to 100% of its total length. In an embodiment, the divided configuration can, for example, be provided along 80% to 90% of the total length.

In an embodiment of the present invention, at least one of the supply sub-channels can be closed or can be reduced in its cross-sectional area independently from the other supply sub-channel and upstream of the receiving device so that substantially no more gas flows to the receiving device through the supply sub-channel, or that the gas volume flow through said supply sub-channel can be reduced. Reduction of the cross-sectional area or closure of one of the supply sub-channels can be performed, for example, by one or a plurality of flaps in this channel, by which this supply sub-channel can be closed partially of fully.

In an embodiment of the present invention, the gas supply to the receiving device is thus carried out directly upstream of the receiving device via two supply sub-channels which can be of different designs, particularly with regard to their cross sectional area. The shapes of the cross sectional areas of these supply sub-channels can further differ from each other directly upstream of the receiving device so that, for example, one of the two supply sub-channels directly upstream of the receiving device is considerably tapered, thus rendering it possible to achieve a nozzle effect and a high flow velocity.

In an embodiment of the present invention, the underlying objective of these measures is to allow for a short-time roasting and a long-time roasting to be selectively performed by a single device. In the case of a long-time roasting, a small quantity of gas will be supplied at a high temperature to the roasting bin and the receiving device, respectively. For this purpose, one of the supply sub-channels can be closed fully or partially so that a reduced gas volume flow will be supplied to the receiving device. The supply of this flow can, for example, be performed via the other, non-closed supply sub-channel. This non-closed supply sub-channel can be a tapered channel so that, during the gas infeed into the receiving device, this supply sub-channel will generate a nozzle effect. By the high flow velocity in the region of the nozzle, a strong and fast movement of the to-be-roasted product can be achieved in the receiving device, thus preventing damage to the product as might be caused by the high roasting temperatures in long-time roasting. For performing a short-time roasting process, a low temperature is used, while a large gas volume flow is supplied to the receiving device. For this purpose, both supply sub-channels can, for example, be fully cleared so that the heated gas is supplied to the receiving device through both supply sub-channels.

In an embodiment of the present invention, there is created a hybrid device adapted to perform a short-time roasting process as well as a long-time roasting process while maintaining the respective typical taste profile. The device of the present invention therefore allows for very flexible handling without the need to redesign the roasting system. It is merely required that the temperature of the roasting air and the flow of the gas volume be controlled in order to switch from short-time roasting to long-time roasting and vice versa. Control of the gas volume flow can be performed, apart from changing the cross sectional area of the supply sub-channels, also by means of the hot-air blower.

In an embodiment of the present invention, a short-time roasting process can, for example, be carried out at a gas temperature of about 300° C., while a long-time roasting process can be carried out at a gas temperature of about 550° C. In the device of the present invention, a roasting process can basically take between 1.5 and 18 minutes, while the temperature of the supplied roasting air can be in the range of from 270° C. to 600° C.

In an embodiment of the present invention, if the gas supply to the receiving device is performed via a perforated metal plate, the gas volume flow via the perforated metal plate can, for example, be variably set in the range from 0% to 100%.

In an embodiment of the present invention, this can be obtained in that, directly upstream of the receiving device as viewed in flow direction, one of the supply sub-channels can be closed particularly by a plurality of flaps arranged parallel to each other in flow direction. These flaps can be designed as lamellae to be rotated in the manner of Venetian blinds which, as viewed in flow direction, can, for example, be arranged upstream of the perforated metal plate and can close the latter partially or fully. A parallel arrangement of the flaps is to be understood in the sense that it is necessary to close all of these flaps in order to fully prevent a gas supply via this supply sub-channel. In contrast thereto, in case of a serial arrangement of the flaps, it would merely be required to close one of these flaps to prevent a gas supply via a channel. In an embodiment, only one of the supply sub-channels can, for example, lead to the perforated metal plate, while the other supply sub-channel can, for example, lead to an open air-supply gap in the direction of the receiving device.

In an embodiment of the present invention, the two supply sub-channels can, for example, be separated from each other by a separating element, such as a partition metal plate. This separating element can be provided with a closeable opening. At the edge of this opening, one of the flaps can be hinged so that the opening is closed when this flap is fully opened. By contrast, when this flap is closed so that a gas supply via the perforated metal plate will not be possible, the opening in the separating element is opened. The flap can, for example, be hinged on the edge of the opening to the effect that, in the closed state of the flap (i.e., in the opened state of the opening), it will conduct the gas flow from a supply sub-channel, which then, via the closed flaps, will have been closed in the direction of the receiving device, through the opening to the other supply sub-channel which can, for example, be arranged below this opening. Via this other supply sub-channel, the whole gas will thus be supplied from the heating device to the receiving device. In this position of the flaps, gas will be supplied to the receiving device via the non-closed supply sub-channel with a very high flow velocity, which will cause a strong movement of the to-be-roasted product in the receiving device. This makes it possible to use high roasting temperatures.

In an embodiment of the present invention, one of the supply sub-channels, directly upstream of the receiving device as viewed in flow direction, can, for example, have a cross-sectional area which amounts to 10% to 30% of the cross-sectional area of the other supply sub-channel directly upstream of the receiving device. In this arrangement, the supply sub-channel having the smaller cross sectional area can be tapered in its end section upstream of the receiving device, whereas the other supply sub-channel is widened in the same section. The tapered and respectively widened shape of the supply sub-channels can, for example, be provided downward in the direction of gravity, and upward, for example, vertically to the direction of the gas supply channel.

In an embodiment of the present invention, the widened shape of one supply sub-channel can be achieved, for example, in that its lower boundary in a section directly upstream of the receiving device comprises a bend of 20° to 45° in downward direction whereas its upper boundary in this section still extends in parallel. In this arrangement, the widened supply sub-channel can, for example, be arranged, as viewed in the direction of gravity, above the tapered supply sub-channel. The tapering of the lower supply sub-channel can, for example, be arranged directly upstream of the receiving device along a length of less than 40 cm. The upper supply sub-channel, in contrast, is widened along a larger section of, for example, up to about 1 m.

In an embodiment of the present invention, the supply sub-channel having the larger cross section can, for example, be closed independently from the other supply sub-channel by at least one flap.

At the same time, the supply sub-channel having the smaller cross section can be closed, in addition to the other closeable supply sub-channel, by a separate flap independently from the other supply sub-channel.

In an embodiment of the present invention, the flap for closing the supply sub-channel having the smaller cross section can be hinged in such a manner on the edge of the opening in the separating element separating the two supply sub-channels so that, in the fully closed state of the flap, the opening is closed. In other words, it is possible by means of the flap to fully close the opening in the separating element so that the two supply sub-channels are separated from each other. In this position of the flap, the other flap for closing the supply sub-channel having the larger cross section must be open, so that the heated gas will be supplied to the receiving bin exclusively via the supply sub-channel having the larger cross section.

In an embodiment of the present invention, the flap provided for closing the supply sub-channel having the larger cross section can, for example, be located so that, in its closed position, it will conduct the gas through the opening in the separating element to the supply sub-channel having the smaller cross section. The flap provided for closing the supply sub-channel having the larger cross section will in this position thus become the separating wall of the tapered supply sub-channel.

In an embodiment of the device of the present invention wherein the supply sub-channel having the larger cross section is to be closed by a plurality of flaps, use can be made of, for example, three flaps. The maximum opening angle of these flaps can vary and particularly decrease in the direction of the other, for example, the lower, supply sub-channel. For example, the maximum opening angle of the flap farthest away from the other supply sub-channel can be about 40°-50° while the maximum opening angle of the intermediate flap is about 30°-40°, and the maximum opening angle of the flap adjacent to the other supply sub-channel is about 22°-32°. An opening angle of 0° is to be understood herein in the sense of that position of the individual flap in which this flap is fully closed. If all flaps have an opening angle of 0°, the gas supply to the receiving device via this supply sub-channel is thus fully interrupted.

By the different maximum opening angles, it is rendered possible to create improved flow conditions, which is useful particularly in connection with tangential roasters and downwardly bent supply sub-channels.

In an embodiment of the present invention, the sub-channel and/or the two supply sub-channels can, for example, comprise, in their last section and upstream of the receiving device as viewed in the gas flow direction, a bend of 20°-45° downward in the direction of gravity. In such an arrangement, the angle of this bend is defined particularly by the course of the separating element between the two supply sub-channels. One of the three flaps which is hinged to the opening in the separating element can, for example, be opened so far as to fully close the opening in the separating element. The maximum opening angle of this flap will thus correspond to the angle at which the separating element is bent downward from the horizontal line.

In an embodiment of the present invention, by means of flaps, the two supply sub-channels can, for example, be closed fully or partially so that the gas volume flow passing through each supply sub-channel can be controlled separately and, for example, in a stepless manner. One or both of the supply sub-channels can herein be closeable.

In an embodiment of the present invention, the supply sub-channels can, for example, be designed so that about 60%-80% of the gas volume flow will pass through the widened supply sub-channel while about 10%-40% of the gas volume flow will pass through the tapered supply sub-channel.

The device 10 according to FIG. 1 comprises a stationary roasting bin 12 which, via perforated metal plate 24, is connected to the upper supply sub-channel 14a. The upper supply sub-channel 14a widens in its last section upstream of the roasting bin 12. In that section, the lower supply sub-channel 14b has a constant cross sectional area and is of a tapered shape only directly upstream of the roasting bin 12 in the direction of an air supply gap 26. In the area of the air supply gap 26, the air will be supplied to the roasting bin 12, in particular tangentially. The two supply sub-channels are separated from each other by a guide metal plate 18. The guide metal plate 18 comprises an opening 20 which can be closed by the lower one of the three flaps, 16c. The gas supply through the first supply sub-channel 14a to the perforated metal plate 24 can be blocked through the three flaps 16a, 16b, 16c. As far as these flaps 16a, 16b, 16c are closed, they will conduct gas from the upper supply sub-channel 14a through the opening 20 to the lower supply sub-channel 14b and from there via the air gap 26 into the roasting bin 12. In this manner, there is obtained a high flow velocity in the region of the air gap 26, which will generate a strong swirling of the product in the roasting bin 12.

The upper of the three flaps, 16a, has the largest opening angle and can, for example, be opened in a range from 0° to 50°. The intermediate flap 16b can be opened in a range of from 0° to 40°, while the lower flap 16c can be opened in a range of from 0° to 32°. At an opening angle of 32°, the lower flap 16c closes the opening 20.

Figure 3:
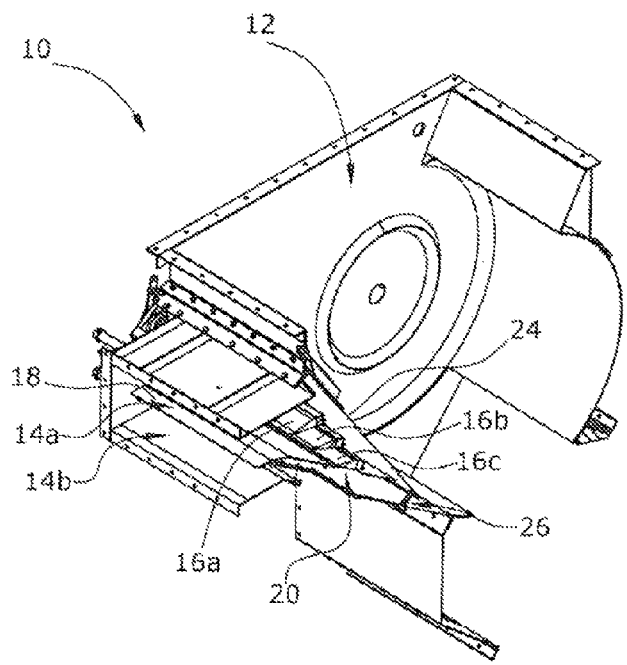
FIG. 3 shows a partially sectional perspective view of an embodiment of the device of the present invention.

In FIG. 3, the same roasting device is illustrated in a three-dimensional oblique view. The heating device for heating the gas supplied to receiving device 12 is not illustrated. For heating, use can be made of heat blowers.

Figure 4:
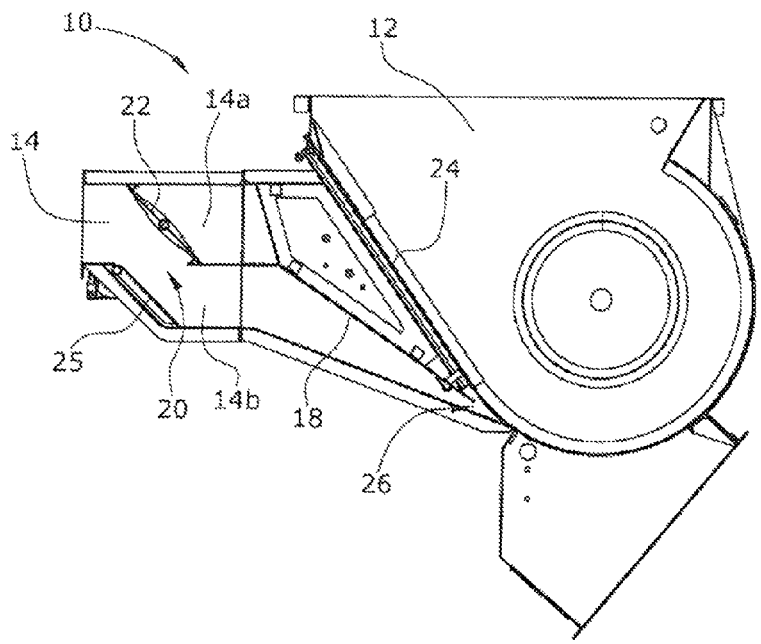
FIG. 4 shows a partially sectional lateral view of an embodiment of the device of the present invention.
Figure 5:
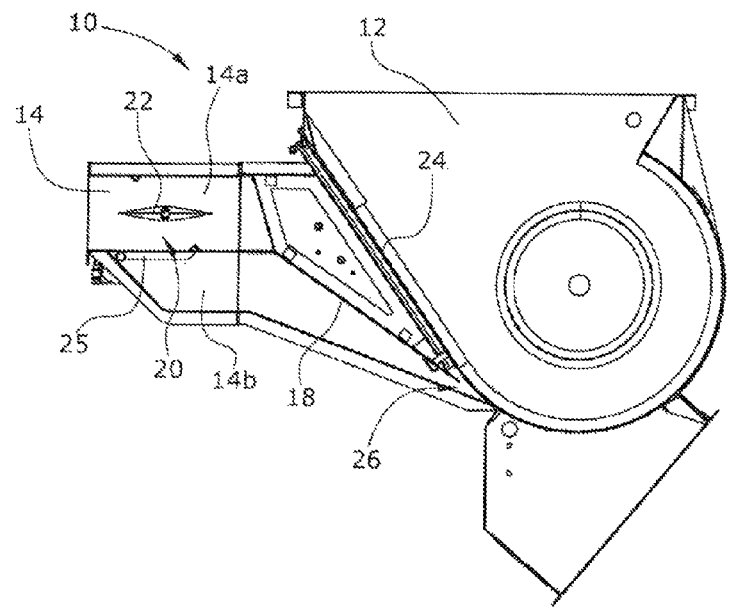
FIG. 5 shows a partially sectional lateral view of an embodiment of the device of the present invention.
Figure 6:
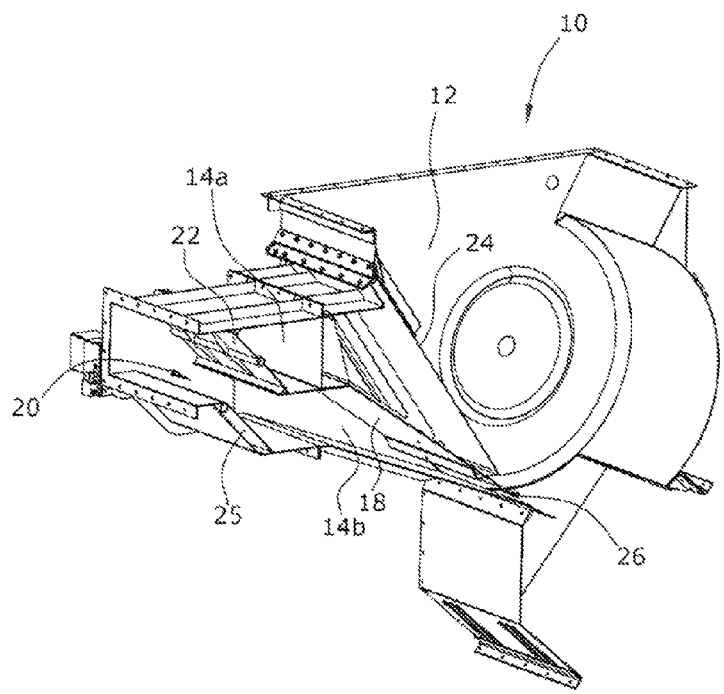
FIG. 6 shows a partially sectional perspective view of an embodiment of the device of the present invention.

FIGS. 4 to 6 show an alternative embodiment of the device of the present invention. This embodiment also comprises a stationary roasting bin 12 provided with a mixing unit and being connected via a perforated metal plate 24 to the two supply sub-channels 14a, 14b. Upstream of the two supply sub-channels 14a, 14b, as viewed in the flow direction of the gas, the gas supply channel 14 is not yet subdivided.

Figure 2:
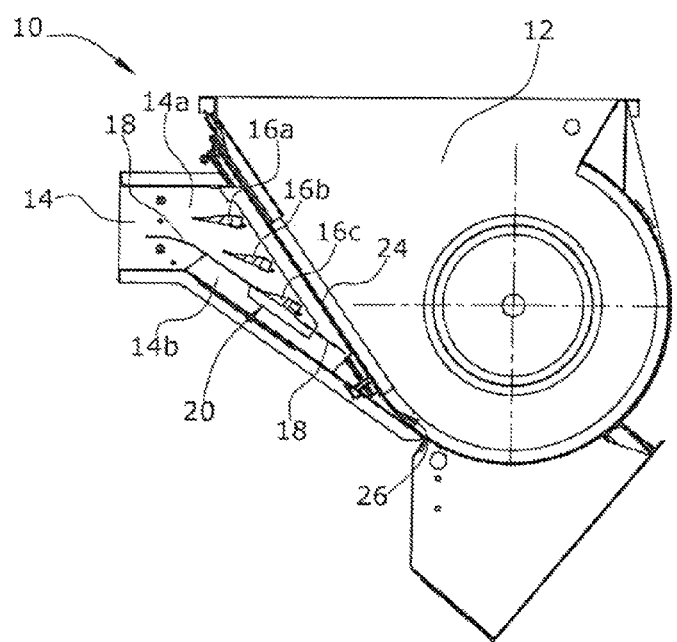
FIG. 2 shows a partially sectional lateral view of an embodiment of the device of the present invention.

The two supply sub-channels 14a, 14b are separated from each other in their last section upstream of the roasting bin 12 by means of a guiding metal sheet 18. In contrast to the first embodiment according to FIGS. 1 to 3, the lower supply sub-channel 14b is of a tapered shape in a larger section upstream of the roasting bin 12. Again, this channel terminates in the air supply gap 26.

Also in this embodiment, the guiding metal sheet 18 comprises a recess 20. In contrast to the embodiment according to FIGS. 1 to 3, said recess 20, as viewed in the flow direction of the gas, is arranged at a farther forward position and can be closed by the flap 25. This flap 25 is hinged to the front edge of the opening 20 as viewed in the flow direction. As far as the flap 25 is opened, flap 22 can, for example, close the upper supply sub-channel 14a and thus will guide air from gas supply channel 14 in the direction of the lower supply sub-channel 14b. In this position, a long roasting cycle can be run, whereas, in the open state of flap 22, there will be run a short roasting cycle at a lower temperature and the area of the perforated metal plate 24 will be cleared for air supply. In case that, in this process, the lower flap 25 is closed, no gas will flow into the roasting bin 12 through the lower supply sub-channel 14b. In this case, the nozzle effect caused by the narrow air gap 26 will thus not occur.

In the method for operating the device of the present invention, a long-time roasting will thus require an at least partial closure of a supply sub-channel 14a so that the gas supply from a heating device to the receiving device 12 is, for example, fully, performed via the other, non-closed supply sub-channel 14b. In this process, a high roasting temperature in the range from 500° C. to 600° C. is used. In long-term roasting, air supply can, for example, be performed via the tapered supply sub-channel 14b.

For short-term roasting, the heated gas will be supplied to the receiving device 12 via the widened upper supply sub-channel 14a. The gas can additionally be fed to the receiving device 12 also via the lower supply sub-channel 14b. For long-time roasting and for short-time roasting alike, the same device will be used. In short-time roasting, the roasting time can be between 1.5 minutes and 5 minutes, while the time length for long-time roasting can be between 8 minutes and 18 minutes. The device can be used also in a range between 3 minutes and 10 minutes, while, in this case the flaps 16a, 16b, 16c, 22, 24 can, for example, take intermediate positions.

The present invention is not limited to embodiments described herein; reference should be had to the appended claims.

What is claimed is:

1. A device for thermally treating a pourable plant product, the device comprising:
    a receiving device configured to receive the pourable plant product; and
    a gas supply channel configured to supply a heated gas to the receiving device, the gas supply channel being divided directly upstream of the receiving device, in a gas flow direction, into a first gas supply sub-channel and a second gas supply sub-channel which follow each other in a direction of gravity, and which are configured to supply the heated gas to the receiving device,
    wherein, a cross section of at least the first gas supply sub-channel is configured to be closed or reduced before the receiving device independently of the second gas supply sub-section so as to eliminate or reduce a volume of the heated gas to the receiving device via the first gas supply sub-channel.

2. The device as recited in claim 1, wherein the pourable plant product is coffee beans.

3. The device as recited in claim 1, further comprising a plurality of flaps disposed parallel to one another in a flow direction of the heated gas directly before the receiving device, the plurality of flaps being configured to close at least the first gas supply sub-channel.

4. The device as recited in claim 3, wherein the plurality of flaps are configured as rotatable lamellae.

5. The device as recited in claim 3, further comprising a separating element configured to separate the first gas supply sub-channel from the second gas supply sub-channel, the separating element comprising a closable opening with an edge, wherein the plurality of flaps comprises a lower flap hinged on the edge of the closable opening so that the closable opening is closed when the lower flap is fully opened.

6. The device as recited in claim 1, wherein the first gas supply sub-channel comprises a cross-sectional area arranged directly before the receiving device, and the second gas supply sub-channel comprises a cross-sectional area arranged directly before the receiving device, the cross-sectional area of the second gas supply sub-channel being 10% to 30% of the cross-sectional area of the first gas supply sub-channel.

7. The device as recited in claim 6, wherein the second gas supply sub-channel further comprises an end section before the receiving device which is tapered, and wherein the first supply sub-channel further comprises an end section before the receiving device which is flared.

8. The device as recited in claim 7, further comprising a first flap configured to close the first gas supply sub-channel independently of the second gas supply sub-channel.

9. The device as recited in claim 8, further comprising a second flap configured to close the second gas supply sub-channel independently of the first gas supply sub-channel.

10. The device as recited in claim 8, wherein the second flap is hinged on the edge of the closable opening so that the closable opening is closed when the second flap is in a fully closed state, and wherein the first flap which is configured to close the first gas supply sub-channel is arranged to conduct the heated gas to the second gas supply sub-channel when the first flap is in a closed state.

11. The device as recited in claim 5, wherein the plurality of flaps further comprising an upper flap and an intermediate flap, the upper flap, the intermediate flap and the lower flap being configured to close the first gas supply sub-channel, a maximum opening angle of each of the upper flap, the intermediate flap, and the lower flap decreasing in a direction of the second gas supply sub-channel, the maximum opening angle of the upper flap arranged furthest from the second gas supply sub-channel being 40° to 50°, the maximum opening angle of the intermediate flap being 30° to 40°, and the maximum opening angle of the lower flap arranged adjacent to the second gas supply sub-channel being 22° to 32°.

12. The device as recited in claim 1, wherein an end section of at least one of the gas supply channel, the first gas supply sub-channel, and the second gas supply sub-channel, arranged before the receiving device in a flow direction of the heated gas comprises a bend of 20° to 45° in the direction of gravity.

13. The device as recited in claim 1, further comprising a plurality of flaps, wherein the first gas supply sub-channel and the second gas supply sub-channel are each separately configured to be at least one of partially or entirely closable via the plurality of flaps and controlled so that a volume of the heated gas flow separately flows through each of the first gas supply sub-channel and the second gas supply sub-channel so as to provide the heated gas at a temperature of 260° C. to 360° C. during a short-time roasting and at a temperature of 400° C. to 550° C. during a long-time roasting without exchanging the receiving device.

14. The device as recited in claim 13, wherein the control is stepless.

* * * * *